(12) United States Patent
Modica et al.

(10) Patent No.: US 8,855,921 B2
(45) Date of Patent: Oct. 7, 2014

(54) METHOD AND APPARATUS FOR TRANSIT MAPPING

(71) Applicant: Navteq B.V., Veldhoven (NL)

(72) Inventors: Leo Modica, Wheaton, IL (US); Leon Stenneth, Chicago, IL (US)

(73) Assignee: Here Global B.V., Veldhoven (NL)

( * ) Notice: Subject to any disclaimer, the term of this patent is extended or adjusted under 35 U.S.C. 154(b) by 0 days.

(21) Appl. No.: 13/781,188

(22) Filed: Feb. 28, 2013

(65) Prior Publication Data

US 2014/0244154 A1 Aug. 28, 2014

(51) Int. Cl.
*G01C 21/26* (2006.01)
*G01C 21/34* (2006.01)
*G06Q 10/04* (2012.01)
*G06T 11/20* (2006.01)
*G01C 21/00* (2006.01)

(52) U.S. Cl.
CPC ............ *G01C 21/34* (2013.01); *G01C 21/3407* (2013.01); *G06Q 10/047* (2013.01); *G06T 11/203* (2013.01); *G01C 21/005* (2013.01)
USPC ........... 701/410; 701/533; 701/468; 705/7.12

(58) Field of Classification Search
CPC ............... G06Q 10/047; G01C 21/005; G01C 21/3407; G06T 11/203
See application file for complete search history.

(56) References Cited

U.S. PATENT DOCUMENTS

| | | | |
|---|---|---|---|
| 6,021,372 A | 2/2000 | Harrington | |
| 6,701,248 B2 | 3/2004 | Petzold et al. | |
| 6,801,850 B1 | 10/2004 | Wolfson | |
| 6,862,524 B1 | 3/2005 | Nagda et al. | |
| 7,099,772 B2 | 8/2006 | Hayot et al. | |
| 7,469,827 B2* | 12/2008 | Katragadda et al. | .......... 235/384 |
| 7,680,596 B2 | 3/2010 | Uyeki et al. | |
| 7,881,863 B2 | 2/2011 | Uyeki et al. | |
| 8,065,072 B2 | 11/2011 | Yoshioka et al. | |
| 2001/0049581 A1* | 12/2001 | Kane et al. | .................... 701/202 |
| 2005/0273250 A1 | 12/2005 | Hamilton et al. | |

(Continued)

FOREIGN PATENT DOCUMENTS

GB 2397683 A * 7/2004

OTHER PUBLICATIONS

Cunningham, K. W., *Modeling Bus Routes and Bus Stops*, Spatial Data Research, Inc. (2003), 4 pages.

(Continued)

*Primary Examiner* — Michael J Zanelli
(74) *Attorney, Agent, or Firm* — Alston & Bird LLP (57) ABSTRACT

A method, apparatus and computer program products are provided for collecting and analyzing route to determine the routes of a transit system. One example method includes receiving GPS data from a plurality of buses or uses from along a transit roué, the discreet GPS reports organized into a set, generating a plurality of clusters, each cluster is comprised of a first GPS point from a first set and one or more subsequent GPS points, each subsequent GPS point from a different set, and wherein each subsequent GPS point is located within a predetermined distance of the first GPS point. The clusters are then connected to form a route polylines. Outliers, inaccuracies, and/or route endpoints may be pruned to improve accuracy and efficiency of the method. The method may also order the aggregated clusters using spatial and temporal data of the GPS reports to improve accuracy.

21 Claims, 7 Drawing Sheets

(56) References Cited

U.S. PATENT DOCUMENTS

2006/0007232 A1* 1/2006 Layne et al. ............... 345/441
2008/0054072 A1   3/2008 Katragadda et al.
2010/0305850 A1* 12/2010 Krumm et al. ............. 701/208

OTHER PUBLICATIONS

European Search Report for Application No. 14 15 2594 dated Jul. 29, 2014.

* cited by examiner

METHOD AND APPARATUS FOR TRANSIT MAPPING

TECHNOLOGICAL FIELD

Embodiments of the present invention relate generally to a method, apparatus, and computer program product for transit mapping.

BACKGROUND

Given a new transit service, determining accurate geometries of the routes that the buses service is a time consuming, complex, and expensive task for transit agencies. Also, for an existing transit service (e.g., Chicago's CTA or New York's MTA) that already knows their route geometries, determining the geometries of new routes of buses after there is an incident such as construction or accident and the buses are re-routed from their original routes just as time consuming, complex and expensive. A manual approach is taken by all transit agencies today whereby people go into the field (i.e. transit service area) with GPS devices and collect and annotate route data over several days. The present invention relates to a newly developed approach that is fully automated where instead of workers going into the field, buses belonging to the transit service produce derived routes. Using localization (i.e. GPS) traces obtained from the buses and the method, apparatus, and/or computer program product, route geometries are able to be accurately produced in real time on demand.

BRIEF SUMMARY

A method, apparatus and computer program product are therefore provided according to an example embodiment of the present invention to determine routes of a transit system.

One example method may include causing reception of location data, wherein the location data is organized into a plurality of sets, each set comprised of a plurality of location points; generating a plurality of clusters, each cluster is comprised of a first location point from a first set and one or more subsequent location points, each subsequent location point from a different set, wherein each subsequent location point is located within a predetermined distance of the first location point; and aggregating, using a processor, the clusters by connecting two or more clusters to form a route polyline. In an alternative embodiment, the method may further include pruning the plurality of clusters based on a number of location points within the cluster. In one embodiment, the method may comprise pruning the two largest clusters. Additionally or alternatively, the method may further comprise determining a number of points in each of the plurality of clusters and aggregating only those clusters comprising greater than a threshold number of location points from the one or more different sets within a predetermined distance of a first point. In another embodiment, the method may include calculating a center point of a cluster as a moving average of each of the points included in the cluster, wherein the aggregating step connects the center points of a plurality of cluster to form route polylines. The method may further include ordering the aggregated data utilizing temporal data and spatial data of at least one location point in each of two or more clusters. The method may also include comparing the route polylines to map data; and adjusting the route polylines according to the map data.

An example apparatus may include at least one processor and at least one memory storing computer program code, wherein the at least one memory and stored computer program code are configured, with the at least one processor, to cause the apparatus to receive location data, wherein the location data is organized into a plurality of sets, each set comprised of a plurality of location points; generate a plurality of clusters, each cluster is comprised of a first location point from a first set and one or more subsequent location points, each subsequent location point from a different set, wherein each subsequent location point is located within a predetermined distance of the first location point; and aggregate the clusters by connecting two or more clusters to form a route polyline. The at least one memory and stored computer program code are further configured, with the at least one processor, to cause the apparatus to prune the plurality of clusters based on a number of location points within the cluster. In one embodiment, the at least one memory and stored computer program code are further configured, with the at least one processor, to cause the apparatus to prune the two largest clusters. In an alternative embodiment the at least one memory and stored computer program code are further configured, with the at least one processor, to cause the apparatus to determine a number of points in each of the plurality of clusters and aggregate only those clusters comprising greater than a threshold number of location points from the one or more different sets within a predetermined distance of a first point. In another embodiment, the at least one memory and stored computer program code are further configured, with the at least one processor, to cause the apparatus to calculate a center point of a cluster as a moving average of each of the points included in the cluster, wherein the aggregation connects the center points of a plurality of cluster to form route polylines. The at least one memory and stored computer program code may be further configured, with the at least one processor, to cause the apparatus to order the aggregated data utilizing temporal data and spatial data of at least one location point in each of two or more clusters. The at least one memory and stored computer program code may also be further configured, with the at least one processor, to cause the apparatus to compare the route polylines to map data and adjust the route polylines according to the map data.

In a further embodiment, a computer program product is provided that includes at least one non-transitory computer-readable storage medium having computer-readable program instructions stored therein, the computer-readable program instructions includes program instructions configured for causing reception of location data, wherein the location data is organized into a plurality of sets, each set comprised of a plurality of location points; generating a plurality of clusters, each cluster is comprised of a first location point from a first set and one or more subsequent location points, each subsequent location point from a different set, wherein each subsequent location point is located within a predetermined distance of the first location point; and aggregating, using a processor, the clusters by connecting two or more clusters to form a route polyline. In an alternative embodiment, the computer-readable program instructions also include program instructions configured for pruning the plurality of clusters based on a number of location points within the cluster. In one embodiment, the computer-readable program instructions also include program instructions configured for pruning the two largest clusters. Additionally or alternatively, the computer-readable program instructions may also include program instructions configured for determining a number of points in each of the plurality of clusters and aggregating only those clusters comprising greater than a threshold number of location points from the one or more different sets within a predetermined distance of a first point. In another embodiment, the computer-readable program instructions also include program instructions configured for calculating a center point of a cluster as a moving average of each of the points included in the cluster, wherein the aggregating step connects the center points of a plurality of cluster to form route polylines. The computer-readable program instructions also include program instructions configured for may also further include ordering the aggregated data utilizing temporal data and spatial data of at least one location point in each of two or more clusters. The computer-readable program instructions may also include program instructions configured for comparing the route polylines to map data and adjusting the route polylines according to the map data.

One example apparatus may include means for causing reception of location data, wherein the location data is organized into a plurality of sets, each set comprised of a plurality of location points; generating a plurality of clusters, each cluster is comprised of a first location point from a first set and one or more subsequent location points, each subsequent location point from a different set, wherein each subsequent location point is located within a predetermined distance of the first location point; and aggregating, using a processor, the clusters by connecting two or more clusters to form a route polyline. In an alternative embodiment, the apparatus may further include means for pruning the plurality of clusters based on a number of location points within the cluster. In one embodiment, the apparatus may further include means for pruning the two largest clusters. Additionally or alternatively, the apparatus may further include means for determining a number of points in each of the plurality of clusters and aggregating only those clusters comprising greater than a threshold number of location points from the one or more different sets within a predetermined distance of a first point. In another embodiment, the apparatus may further include means for calculating a center point of a cluster as a moving average of each of the points included in the cluster, wherein the aggregating step connects the center points of a plurality of cluster to form route polylines. The apparatus may further include means for ordering the aggregated data utilizing temporal data and spatial data of at least one location point in each of two or more clusters. The apparatus may further include means for comparing the route polylines to map data; and adjusting the route polylines according to the map data.

BRIEF DESCRIPTION OF THE DRAWINGS

Having thus described embodiments of the invention in general terms, reference will now be made to the accompanying drawings, which are not necessarily drawn to scale, and wherein:

DETAILED DESCRIPTION

Some example embodiments will now be described more fully hereinafter with reference to the accompanying drawings, in which some, but not all embodiments are shown. Indeed, the example embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Moreover, the term "exemplary", as may be used herein, is not provided to convey any qualitative assessment, but instead merely to convey an illustration of an example. Thus, use of any such terms should not be taken to limit the spirit and scope of embodiments of the present invention.

As used herein, the term "circuitry" refers to all of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or application specific integrated circuit for a mobile phone or a similar integrated circuit in a server, a cellular network device, or other network device.

Figure 1:
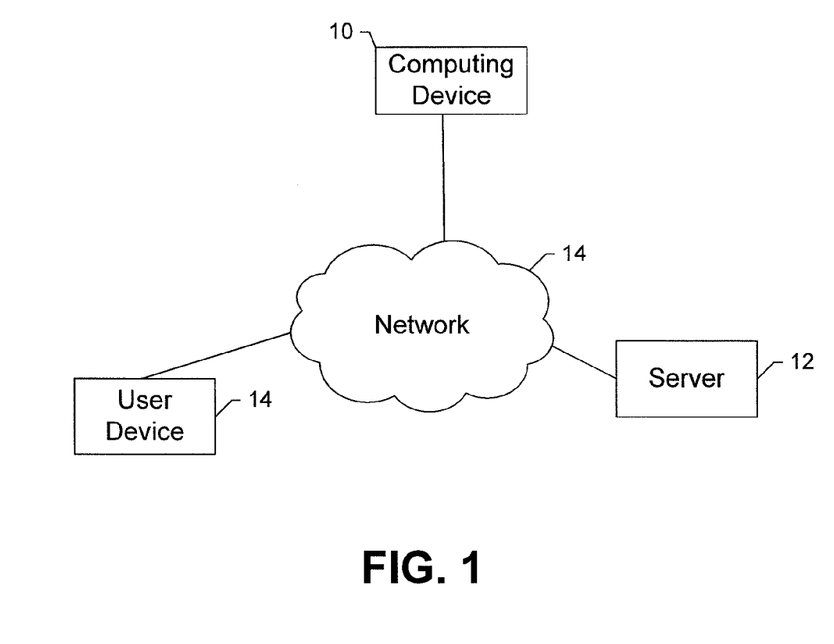
FIG. 1 is block diagram of a system that may be specifically configured in accordance with an example embodiment of the present invention.

Referring now of FIG. 1, a system that supports communication, either wirelessly or via a wireline, between a computing device 10 and a server 12 or other network entity (hereinafter generically referenced as a "server") is illustrated. As shown, the computing device and the server may be in communication via a network 14, such as a wide area network, such as a cellular network or the Internet or a local area network. However, the computing device and the server may be in communication in other manners, such as via direct communications between the computing device and the server.

The computing device 10 may be embodied by a number of different devices including mobile computing devices, such as a personal digital assistant (PDA), mobile telephone, smartphone, laptop computer, tablet computer, or any combination of the aforementioned, and other types of voice and text communications systems. Alternatively, the computing device may be a fixed computing device, such as a personal computer, a computer workstation or the like. The server 12 may also be embodied by a computing device and, in one embodiment, is embodied by a web server. Additionally, while the system of FIG. 1 depicts a single server, the server may be comprised of a plurality of servers which may collaborate to support browsing activity conducted by the computing device. The user device 14 may be embodied by a computing device, and in one embodiment, may be comprised of a plurality of computing devices.

Figure 2:
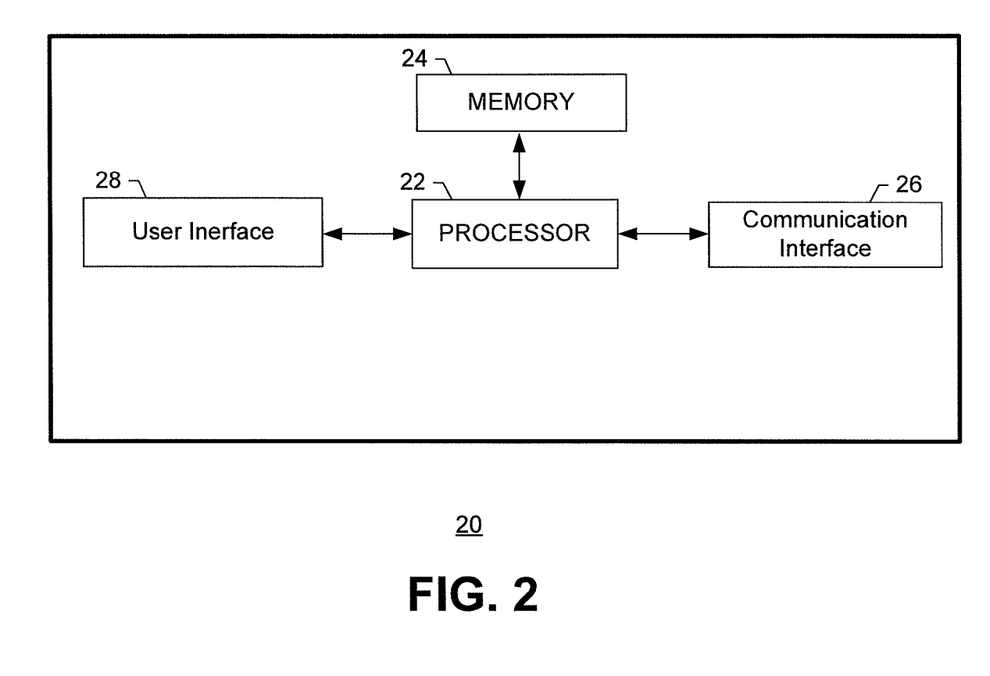
FIG. 2 is a block diagram of an apparatus that may be specifically configured in accordance with an example embodiment of the present invention.

Regardless of the type of device that embodies the computing device 10, the computing device may include or be associated with an apparatus 20 as shown in FIG. 2. In this regard, the apparatus may include or otherwise be in communication with a processor 22, a memory device 24, a communication interface 26 and a user interface 28. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

In some embodiments, the processor 22 (and/or co-processors or any other processing circuitry assisting or otherwise associated with the processor) may be in communication with the memory device 24 via a bus for passing information among components of the apparatus. The memory device may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus 20 to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 20 may be embodied by a computing device 10 configured to employ an example embodiment of the present invention. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a head mounted display) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor. In one embodiment, the processor may also include user interface circuitry configured to control at least some functions of one or more elements of the user interface 28.

Meanwhile, the communication interface 26 may be any means such as a device or circuitry embodied in either hardware or a combination of hardware and software that is configured to receive and/or transmit data between the computing device 10 and a server 12. In this regard, the communication interface 26 may include, for example, an antenna (or multiple antennas) and supporting hardware and/or software for enabling communications wirelessly. Additionally or alternatively, the communication interface may include the circuitry for interacting with the antenna(s) to cause transmission of signals via the antenna(s) or to handle receipt of signals received via the antenna(s). For example, the communications interface may be configured to communicate wirelessly with the head mounted displays 10, such as via Wi-Fi, Bluetooth or other wireless communications techniques. In some instances, the communication interface may alternatively or also support wired communication. As such, for example, the communication interface may include a communication modem and/or other hardware/software for supporting communication via cable, digital subscriber line (DSL), universal serial bus (USB) or other mechanisms. For example, the communication interface may be configured to communicate via wired communication with other components of the computing device.

The user interface 28 may be in communication with the processor 22, such as the user interface circuitry, to receive an indication of a user input and/or to provide an audible, visual, mechanical, or other output to a user. As such, the user interface may include, for example, a keyboard, a mouse, a joystick, a display, a touch screen display, a microphone, a speaker, and/or other input/output mechanisms. In some embodiments, a display may refer to display on a screen, on a wall, on glasses (e.g., near-eye-display), in the air, etc. The user interface may also be in communication with the memory 24 and/or the communication interface 26, such as via a bus.

Figure 3:
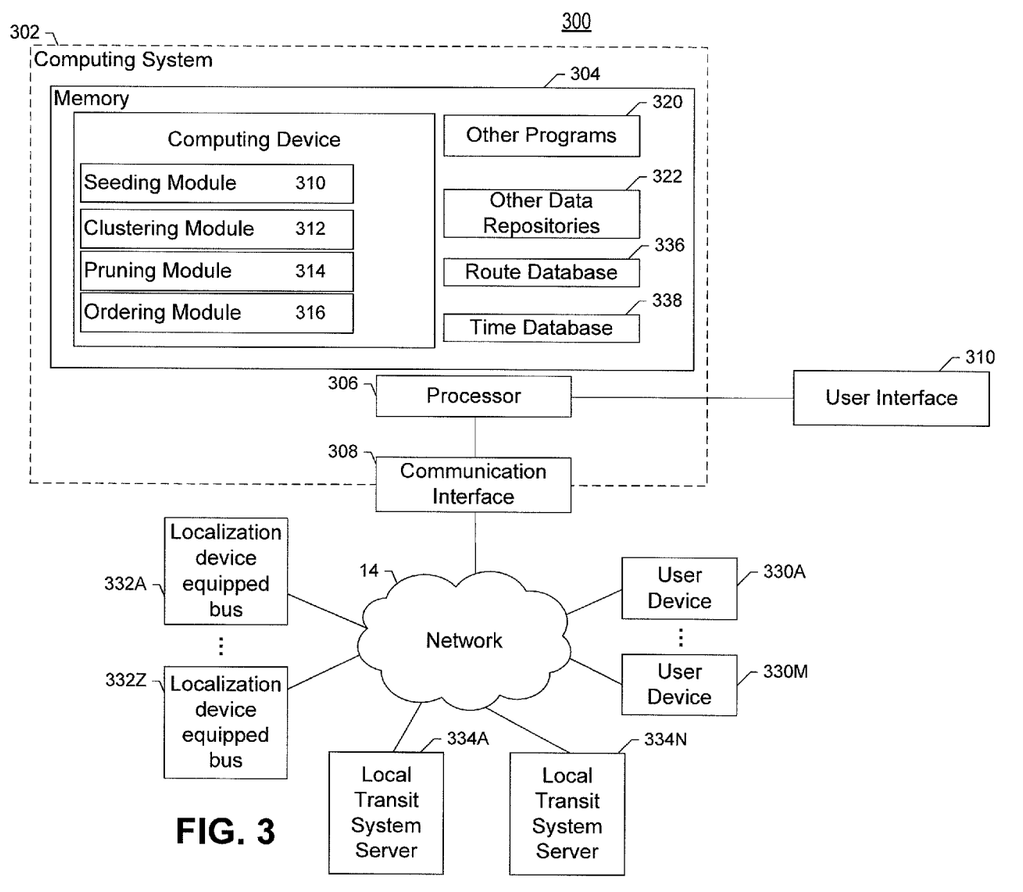
FIG. 3 is a block diagram of an apparatus that may be specifically configured in accordance with an example embodiment of the present invention.

FIG. 3 is an example block diagram of an example computing system 300 for practicing embodiments of an automated transit route derivation system 302. In particular, FIG. 3 shows a system 300 that may be utilized to implement an automated transit route derivation system 302. Note that one or more general purpose or special purpose computing systems/devices may be used to implement the automated transit route derivation system 302. In addition, the system 302 may comprise one or more distinct computing systems/devices and may span distributed locations. Furthermore, each block shown may represent one or more such blocks as appropriate to a specific embodiment or may be combined with other blocks. For example, in some embodiments the system 302 may contain a seeding module 312, a clustering module 314, a pruning module 316, an ordering module 318 or a combination thereof. In other example embodiments, the seeding module 312, the clustering module 314, the pruning module 316, and/or the ordering module 318 may be configured to operate on separate systems (e.g. a mobile terminal and a remote server, multiple remote servers and/or the like). For example, the seeding module 312, the clustering module 314, the pruning module 316, and/or the ordering module 318 may be configured to operate on a mobile terminal. Also, automated transit route derivation system 302 may be implemented in software, hardware, firmware, or in some combination to achieve the capabilities described herein.

While the system 302 may be employed, for example, by a mobile terminal 10, stand-alone system (e.g. remote server), it should be noted that the components, devices or elements described below may not be mandatory and thus some may be omitted in certain embodiments. Additionally, some embodiments may include further or different components, devices or elements beyond those shown and described herein.

In the embodiment shown, system 302 comprises a computer memory ("memory") 304, one or more processors 306 (e.g. processing circuitry) and a communications interface 308. The computing device(s) are shown residing in memory 304. In other embodiments, some portion of the contents, some or all of the components of the automated transit route derivation device 302 may be stored on and/or transmitted over other computer-readable media. The components of the automated transit route derivation device 302 preferably execute on one or more processors 306 and are configured to receive transit data and derive a transit route, schedule, and/or stops. Other code or programs 320 (e.g., an administrative interface, a Web server, and the like) and potentially other data repositories, such as data repository 322, also reside in the memory 304, and preferably execute on processor 306. Of note, one or more of the components in FIG. 3 may not be present in any specific implementation.

In a typical embodiment, as described above, the automated transit route derivation system 302 may include a seeding module 312, a clustering module 314, a pruning module 316, an ordering module 318 or a combination thereof. The seeding module 312, the clustering module 314, the pruning module 316, the ordering module 318 or a combination thereof may perform functions such as those outlined in FIG. 1. The automated transit route derivation system 302 interacts via the network 14 via a communications interface 308 with (1) mobile terminals 330, (2) localization device equipped bus(es) 332 and/or (3) local transit system servers 334. The network 14 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. In this regard, the communications interface 308 may be capable of operating with one or more air interface standards, communication protocols, modulation types, access types, and/or the like. More particularly, the system 302, the communications interface 308 or the like may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

In an example embodiment, components/modules of the automated transit route derivation system 302 may be implemented using standard programming techniques. For example, the automated transit route derivation system 302 may be implemented as a "native" executable running on the processor 306, along with one or more static or dynamic libraries. In other embodiments, the automated transit route derivation system 302 may be implemented as instructions processed by a virtual machine that executes as one of the other programs 320. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the automated transit route derivation system 302, can be made available by standard mechanisms such as through C, C++, C#, and Java APIs; libraries for accessing files, databases, or other data repositories; through languages such as XML; or through Web servers, FTP servers, or other types of servers providing access to stored data. A data store may also be included and it may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the automated transit route derivation system 302 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Some or all of the system components and data structures may also be stored as a web application, "app", or any HTML5 or JavaScript™ application, such as a computer software application that is coded in a browser-supported programming language (such as JavaScript™) combined with a browser-rendered markup language like HTML5, reliant on a common web browser to render the application executable. The opening of a web page or "app" may be performed by a web browser on a user's mobile communications device 10. An HTML5 or JavaScript™ "app" allows web page script to contact a server 12, such as those shown in FIG. 1, for storing and retrieving data without the need to re-download an entire web page. Some or all of the system components and data structures may also be stored as a privileged web application or privileged web app. A privileged web app is a piece of web content that may have been verified by, for example, means of an app store or stores or may have obtained or downloaded from a source that is trusted source. A trusted source may provide a privileged web app that may be enabled to override the default power settings. Such computer program products may also take other forms in other embodiments. Accordingly, embodiments of this disclosure may be practiced with other computer system configurations.

Figure 4:
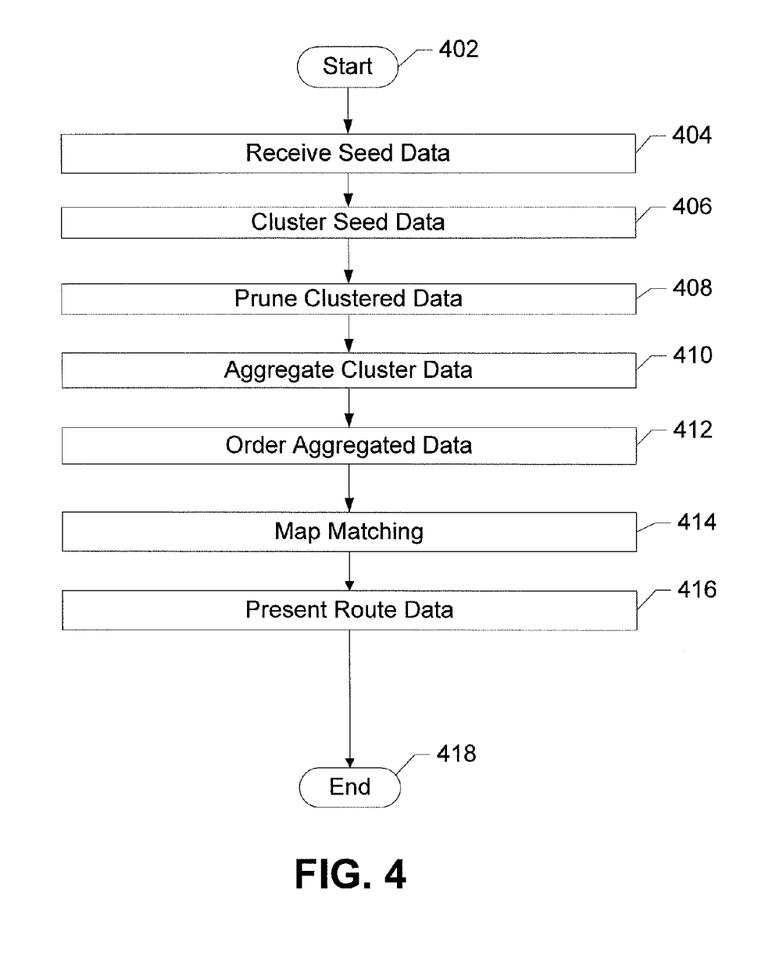
FIG. 4 is an example flowchart illustrating a method of operating an example apparatus in accordance with an embodiment of the present invention.

FIG. 4 illustrates an example flowchart of the example operations performed by a method, apparatus and computer program product in accordance with an embodiment of the present invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 26 of an apparatus employing an embodiment of the present invention and executed by a processor 24 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIG. 4, when executed, convert a computer or processing circuitry into a particular machine configured to perform an example embodiment of the present invention. Accordingly, the operations of FIG. 4 define an algorithm for configuring a computer or processing to perform an example embodiment. In some cases, a general purpose computer may be provided with an instance of the processor which performs the algorithms of FIG. 4 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations herein may be modified or further amplified as described below. Moreover, in some embodiments additional optional operations may also be included. It should be appreciated that each of the modifications, optional additions or amplifications below may be included with the operations above either alone or in combination with any others among the features described herein.

FIG. 4 is an example flowchart illustrating a method of operating an example computing system performed in accordance with an embodiment of the present invention. As shown in block 404 of FIG. 4, the apparatus 20 embodied by the computing device 10 may therefore be configured to receive seed data. The apparatus embodied by the computing device therefore includes means, such as the processor 22, the communication interface 26 or the like, for causing reception of the seed data.

A specific example in the context of an embodiment of the present invention may be causing the reception of one or more GPS traces obtained from GPS devices. In one embodiment, GPS traces may be received as seed data. In another embodiment, the raw GPS traces may be organized by route and/or direction and then may be received as seed data. Furthermore, two data collection strategies may be used (1) Participatory sensing (PS)—Humans submit GPS or other sensor reports via check-in and/or (2) a kind of opportunistic sensing (OS) whereby the GPS device is on a bus and submits GPS reports periodically. Here, a GPS trace $t_1$ is formed.

As shown in block 406 of FIG. 4, the apparatus 20 embodied by the computing device 10 may therefore be configured to cluster the seed data. The apparatus embodied by the computing device therefore includes means, such as the processor 22, the communication interface 26 or the like, for clustering the seed data. In one embodiment, block 406 comprises spatial cluster formation, wherein the clusters include a point from one GPS trace and one or more points from one or more different traces within a predetermined distance. Thus, for all GPS points $p_1, p_2, p_3 \ldots p_z$ on $t_1$, the present invention may form a cluster with the GPS points on the traces in $t_{set}$ (set of traces for that route and pattern) that have GPS points within a predetermined distance (e.g., 40 m). Thus, we'll have z clusters. In one embodiment, the cluster may comprise a center point, such that the center point is determined using a weighted spatial average. Here, the center point may not move as new GPS points are added. In an alternative embodiment, each cluster may comprise a center computed such that the cluster center shifts as we add new GPS points to the cluster. In one embodiment, at each GPS point on $t_1$, added is the closest point on any other trace $t_i \epsilon t_{set}$ unless a predetermined threshold is exceeded.

As shown in block 408 of FIG. 4, the apparatus 20 embodied by the computing device 10 may therefore be configured to prune the clustered data. The apparatus embodied by the computing device therefore includes means, such as the processor 22, the communication interface 26 or the like, for pruning the clustered data. In the context of the present invention, pruning refers to removing clusters. Clusters may be pruned because of inaccuracies and/or outliers. Additionally or alternatively, pruning may also include removing the two largest clusters. The two largest clusters may be assumed to be the start and end of the trip and therefore may comprise duplicate or near duplicate points from where a bus may be sitting or stopped. By way of example, given the set of clusters $t_{set}$, we compute $t_{mean}$, the mean number of GPS reports within the clusters. Let $c_1, c_2, c_3 \ldots c_m$ be the clusters along the trace. Then $ci_{size}$ is the number of GPS reports in cluster i and $$t_{mean} = \frac{\sum_1^m ci_{size}}{m},$$

without the largest two clusters (i.e. start and end of trips). Next, clusters with sizes below a predetermined threshold, such as a fraction (e.g., ¼) of $t_{mean}$, are pruned. The remaining clusters are called $t_{set}'$. Additionally or alternatively, $t_{set}'$ may be dynamic since the mean may be changing as additional GPS reports are considered, thus the requirement for pruning may change.

Figure 5A:
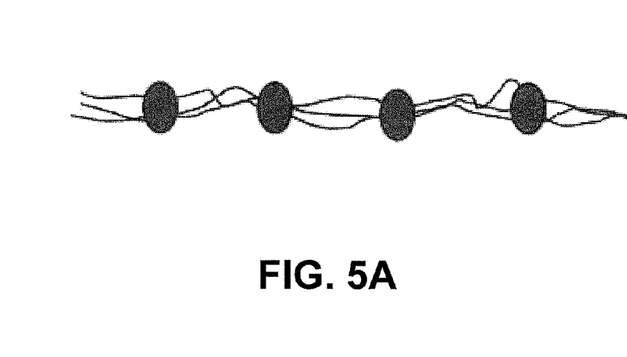
FIGS. 5A-5D show illustrations exemplifying an example method of determining a transit route according to an embodiment of the present invention.
Figure 5B:
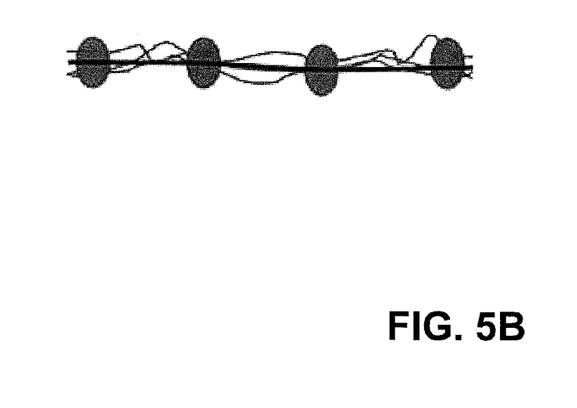

As shown in block 410 of FIG. 4, the apparatus 20 embodied by the computing device 10 may therefore be configured to aggregate the clustered data. The apparatus embodied by the computing device therefore includes means, such as the processor 22, the communication interface 26 or the like, for causing aggregation of the clustered data. Aggregation of the clustered data may comprise converting points represented as clusters into polylines or track lines. Additionally or alternatively, the centers of two or more clusters are connected to form routes. FIGS. 5a and 5b show images before and after clusters centers are joined (track points).

FIG. 5a shows clusters derived from an example embodiment of the present invention. Here, the start and end of the trips maintain a higher distribution of GPS reports than any other points on the route. This observation makes sense since busses are normally waiting at these start and end points of the route. Further, FIG. 5b shows the result after the clusters are aggregated and their cluster centers are joined. From FIG. 5b, it can be seen that the route polyline may not be well formed. The Figure shows that the route polyline may have many edges, which may be because the clusters are not ordered.

As shown in block 412 of FIG. 4, the apparatus 20 embodied by the computing device 10 may therefore be configured to order the aggregated data. The apparatus embodied by the computing device therefore includes means, such as the processor 22, the communication interface 26 or the like, for causing the ordering of the aggregated data.

Figure 5C:
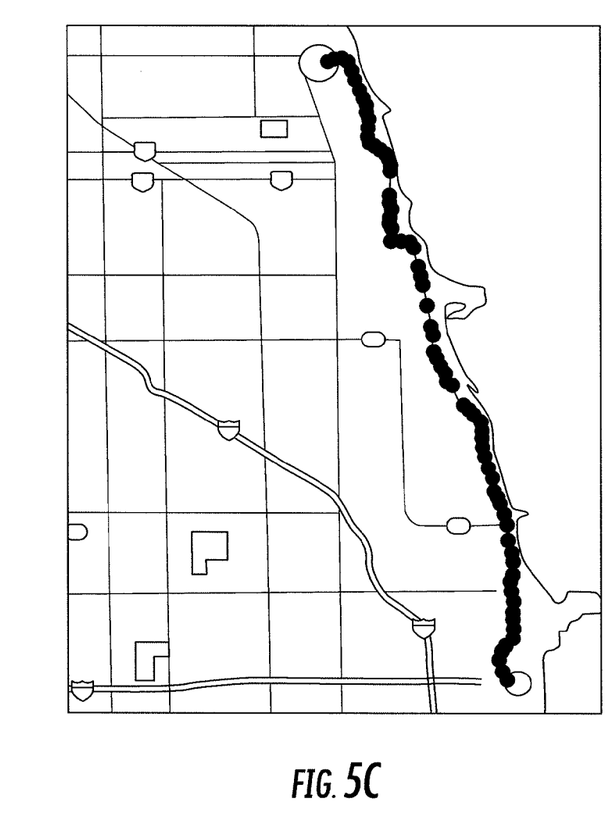

As shown in FIG. 5c, the aggregated clusters are not ordered; to order the aggregated clusters, a spatial ordering strategy may be utilized. In another embodiment, a spatial and temporal ordering strategy may be utilized.

As discussed above, start and end points of routes may have the highest density clusters. Thus, for cluster ordering, the largest cluster may become cluster one and the remaining clusters are ordered relative to cluster one (i.e. the first cluster). Let the set of clusters $t_{set}'$ be represented as $\{c_1, c_2, \ldots, c_n\}$ and let $c_i$ represent the $i^{th}$ cluster, then $c_1$ is the cluster with the highest number of GPS reports. Once a cluster is ordered, it is removed from $t_{set}'$. The algorithm is simple and computes as follows.

$$c_i = \begin{cases} c_1, \text{ if cluster size is maximim} \\ c_j \text{ that leads to min } dist(c_{i-1}, c_j \in t_{set}')) \text{ where } 2 < j \leq n, \text{ otherwise} \\ \text{s.t. } dist(u, v) \text{ is the distance between cluster } u \text{ and cluster } v \end{cases}$$

Figure 6:
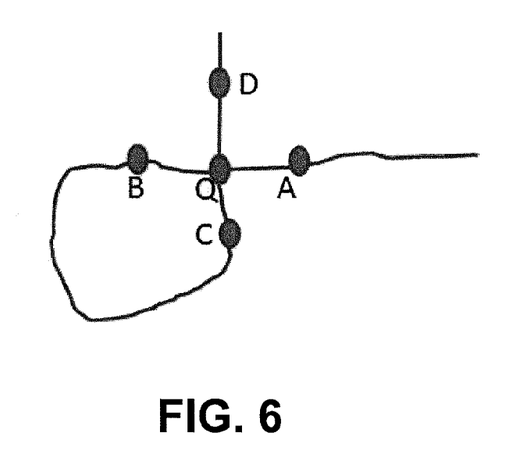
FIG. 6 shows an illustration exemplifying an example method of alternative embodiment of the present invention for ordering locations points.

In another embodiment of the present invention, spatial and temporal ordering may be utilized. In yet another embodiment, spatial and temporal ordering using a Viterbi scheme may be utilized. Given a set of nodes, Viterbi's algorithm can determine the most probable path. Consequently, the present invention provides the spatial and temporal ordering of the clusters under any road geometry given the observation space, state space, sequence of observations, transition matrix that stores the transition probability of transiting from state to state, probability of observing from state, and an array of initial probabilities. The final derived path is a sequence of states that generated the observations. For example, FIG. 6 shows an example circular route and a spatial ordering. Here, even if C's or D's Euclidian distance to Q's center is less than that of B's distance, the present invention will take the temporal properties of B, C, D, and Q into consideration. From the temporal properties, B's reports are determined to be before C's in the time domain and C's are before D's. Thus, spatial and temporal ordering may be more robust than only spatial ordering.

As shown in block 414 of FIG. 4, the apparatus 20 embodied by the computing device 10 may therefore be configured to match the aggregated data to map data. The apparatus embodied by the computing device therefore includes means, such as the processor 22, the communication interface 26 or the like, for causing matching of the aggregated data to map data.

Here, the clusters are aggregated and ordered, and a polyline representing the route is received. In one embodiment, the derived routes may be aligned with the road's geometry and further steps may not be required. In another embodiment of the present invention, because of GPS positioning accuracies for example, the derived route may not be well aligned with the road's geometry. Here, given the ordered clusters as obtained from the ordering step, a map matching algorithm may be utilized to ensure that the derived route is well aligned with the road geometry. Map matching may comprise receiving and/or accessing map data and utilizing one of many known techniques for map matching.

Figure 5D:
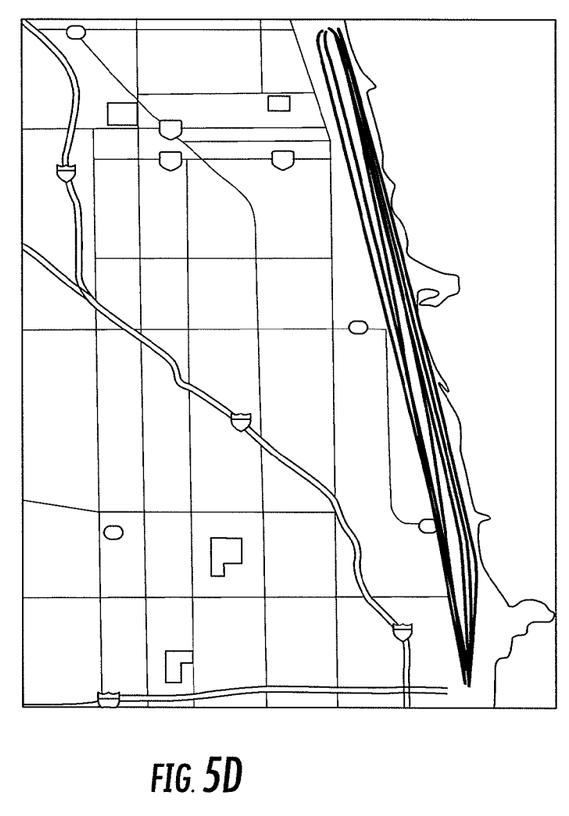

As shown in block 416 of FIG. 4, the apparatus 20 embodied by the computing device 10 may therefore be configured to present the route data. The apparatus embodied by the computing device therefore includes means, such as the processor 22, the communication interface 26 or the like, for causing presentation of the route data. FIG. 6d shows an example route data output.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
    causing reception of location data, wherein the location data is organized into a plurality of sets, each set comprised of a plurality of location points;
    generating a plurality of clusters, each cluster is comprised of a first location point from a first set and one or more subsequent location points, each subsequent location point from a different set, wherein each subsequent location point is located within a predetermined distance of the first location point; and
    aggregating, using a processor, the clusters by connecting two or more clusters to form a route polyline.

2. The method of claim 1 further comprising pruning the plurality of clusters based on a number of location points within the cluster.

3. The method of claim 1 further comprising pruning the two largest clusters.

4. The method of claim 1 further comprising determining a number of points in each of the plurality of clusters and aggregating only those clusters comprising greater than a threshold number of location points from the one or more different sets within a predetermined distance of a first point.

5. The method of claim 1 further comprising calculating a center point of a cluster as a moving average of each of the points included in the cluster, wherein the aggregating step connects the center points of a plurality of cluster to form route polylines.

6. The method of claim 1 further comprising ordering the aggregated data utilizing temporal data and spatial data of at least one location point in each of two or more clusters.

7. The method of claim 1 further comprising comparing the route polylines to map data; and adjusting the route polylines according to the map data.

8. An apparatus comprising at least one processor and at least one memory including computer program code, the at least one memory and the computer program code configured to, with the processor, cause the apparatus to at least:
    cause reception of location data, wherein the location data is organized into a plurality of sets, each set comprised of a plurality of location points;
    generate a plurality of clusters, each cluster is comprised of a first location point from a first set and one or more subsequent location points, each subsequent location point from a different set, wherein each subsequent location point is located within a predetermined distance of the first location point;
    cause aggregation of the clusters by connecting two or more clusters to form a route polyline.

9. An apparatus according to claim 8, wherein the at least one memory and the computer program code are further configured to, with the processor, cause the apparatus to prune the plurality of clusters based on a number of location points within the cluster.

10. An apparatus according to claim 8, wherein the at least one memory and the computer program code are further configured to, with the processor, cause the apparatus to prune the two largest clusters.

11. An apparatus according to claim 8, wherein the at least one memory and the computer program code are further configured to, with the processor, cause the apparatus to:
    determine a number of points in each of the plurality of clusters; and
    cause aggregation of only those clusters comprising greater than a threshold number of location points from the one or more different sets within a predetermined distance of a first point.

12. An apparatus according to claim 8, wherein the at least one memory and the computer program code are further configured to, with the processor, cause the apparatus to calculate a center point of a cluster as a moving average of each of the points included in the cluster, wherein the aggregating step connects the center points of a plurality of cluster to form route polylines.

13. An apparatus according to claim 8, wherein the at least one memory and the computer program code are further configured to, with the processor, cause the apparatus to order the aggregated data utilizing temporal data and spatial data of at least one location point in each of two or more clusters.

14. An apparatus according to claim 8, wherein the at least one memory and the computer program code are further configured to, with the processor, cause the apparatus to compare the route polylines to map data; and adjust the route polylines according to the map data.

15. A computer program product comprising at least one non-transitory computer-readable storage medium having computer-executable program code portions stored therein, the computer-executable program code portions comprising program code instructions for:

causing reception of location data, wherein the location data is organized into a plurality of sets, each set comprised of a plurality of location points;

generating a plurality of clusters, each cluster is comprised of a first location point from a first set and one or more subsequent location points, each subsequent location point from a different set, wherein each subsequent location point is located within a predetermined distance of the first location point; and aggregating, using a processor, the clusters by connecting two or more clusters to form a route polyline.

16. A computer program product according to claim 15, wherein the computer-executable program code portions further comprise program code instructions for:

pruning the plurality of clusters based on a number of location points within the cluster.

17. A computer program product according to claim 15, wherein the computer-executable program code portions further comprise program code instructions for pruning the two largest clusters.

18. A computer program product according to claim 15, wherein the computer-executable program code portions further comprise program code instructions for determining a number of points in each of the plurality of clusters and aggregating only those clusters comprising greater than a threshold number of location points from the one or more different sets within a predetermined distance of a first point.

19. A computer program product according to claim 15, wherein the computer-executable program code portions further comprise program code instructions for calculating a center point of a cluster as a moving average of each of the points included in the cluster, wherein the aggregating step connects the center points of a plurality of cluster to form route polylines.

20. A computer program product according to claim 15, wherein ordering the aggregated data utilizing temporal data and spatial data of at least one location point in each of two or more clusters.

21. A computer program product according to claim 15, wherein the computer-executable program code portions further comprise program code instructions for comparing the route polylines to map data; and adjusting the route polylines according to the map data.

* * * * *